United States Patent
Tanaka et al.

(10) Patent No.: US 7,361,119 B2
(45) Date of Patent: Apr. 22, 2008

(54) NEEDLE BEARING AND SPEED REDUCER USING THE NEEDLE BEARING

(75) Inventors: Minoru Tanaka, Mie (JP); Masakazu Kurita, Mie (JP); Koji Nakamura, Mie (JP)

(73) Assignee: TS Corporation, Tokyo (JP)

( * ) Notice: Subject to any disclaimer, the term of this patent is extended or adjusted under 35 U.S.C. 154(b) by 0 days.

(21) Appl. No.: 11/620,841

(22) Filed: Jan. 8, 2007

(65) Prior Publication Data

US 2007/0107546 A1    May 17, 2007

Related U.S. Application Data

(62) Division of application No. 10/814,889, filed on Mar. 31, 2004.

(30) Foreign Application Priority Data

Mar. 31, 2003    (JP) .............................. 2003-093599

(51) Int. Cl.
*F16H 57/08*    (2006.01)
*F16C 33/48*    (2006.01)

(52) U.S. Cl. ...................... 475/348; 384/572

(58) Field of Classification Search ............... 475/348, 475/170, 168; 384/564, 569, 572, 576, 588
See application file for complete search history.

(56) References Cited

U.S. PATENT DOCUMENTS

| | | | |
|---|---|---|---|
| 1,917,452 A * | 7/1933 | Lott ............................ 384/564 |
| 2,044,168 A * | 6/1936 | Heim ........................... 384/564 |
| 2,765,202 A | 10/1956 | Barr et al. |
| 2,765,203 A | 10/1956 | Barr et al. |
| 3,827,771 A | 8/1974 | Ferlund |
| 4,955,732 A | 9/1990 | Behrens |
| 5,989,144 A * | 11/1999 | Chen et al. ................. 475/168 |
| 6,176,623 B1 | 1/2001 | Zeigler |

FOREIGN PATENT DOCUMENTS

| JP | 52-124353 A | 9/1977 |
|---|---|---|
| JP | 8-226498 A | 9/1996 |
| JP | 2000-055145 A | 2/2000 |

\* cited by examiner

*Primary Examiner*—Tisha Lewis
(74) *Attorney, Agent, or Firm*—Panitch Schwarze Belisario & Nadel LLP

(57) ABSTRACT

A radial inner end of a retainer is spaced radially outwardly from a radial outer end of a sliding-contact region, and with this construction the axial movement of each needle roller is limited not by the retainer but by an inner ring, and a restriction flange. Therefore, a large axial force developing in the needle rollers is received by the inner ring and the restriction flange, and as a result, the retainer having low rigidity can be satisfactorily used. Therefore, any suitable material such as a synthetic resin can be selected for the retainer, and besides the wall thickness of the retainer can be made small.

3 Claims, 3 Drawing Sheets

NEEDLE BEARING AND SPEED REDUCER USING THE NEEDLE BEARING

CROSS-REFERENCE TO RELATED APPLICATIONS

This application is a division of U.S. patent application Ser. No. 10/814,889 filed Mar. 31, 2004.

BACKGROUND OF THE INVENTION

This invention relates to a needle bearing and also to a speed reducer using this needle bearing.

One known conventional needle bearing is disclosed, for example, in the above JP-UM-A-52-124353. This bearing comprises a retainer of an annular shape which includes a cylindrical tubular portion having a multiple of rectangular restriction holes (which are formed therein, extend in an axial direction, and are spaced at equal intervals in a circumferential direction), and also has flange portions projecting radially inwardly respectively from opposite axial ends of the cylindrical tubular portion, and a multiple of needle rollers which are received at their radially-outward end portions in the restriction holes, respectively, and are restricted in axial movement by the flange portions. A radial length of each of the flange portions is slightly smaller than the diameter of the needle rollers.

Such a needle bearing is provided between a shaft (internal member) and an external gear (external member) of a speed reducer (for example, an eccentric rotary-type speed reducer) as disclosed in JP-A-8-226498, and when the internal and external members are rotated relative to each other, an inner ring of a conical bearing, provided between the shaft and a carrier, can be brought into sliding contact with the flange portion of the retainer of the needle bearing, thereby limiting the axial movement of the whole of the needle bearing.

In the above needle bearing, there are occasions when the needle roller is skewed relative to its normal rotation axis because of misalignment. In such a case, this needle roller imparts a large axial force (skewing force) to the retainer. However, the retainer must have enough rigidity to withstand such an axial force, and therefore there were encountered problems that the material for forming the retainer was limited to steel and that a wall thickness of the retainer need to be larger than a predetermined value.

SUMMARY OF THE INVENTION

It is an object of this invention to provide a needle bearing in which any suitable material can be freely selected for a retainer, and a wall thickness of the retainer can be made small. Another object is to provide a speed reducer using such needle bearing.

The above object has been achieved by A needle bearing adapted to be mounted in an annular space between an external member and an internal member so as to allow a relative rotation between the external and internal members, the needle bearing comprising: a retainer of a substantially-annular shape having a plurality of substantially-rectangular restriction holes therein extending in an axial direction of the retainer so as to be spaced at a predetermined interval in a circumferential direction of the retainer; and a plurality of needle rollers each of which is received in the respective restriction hole at a radially-outward end portion thereof and is held in rolling contact with both of an inner periphery of the external member and an outer periphery of the internal member, wherein a sliding-contact region, to which a restriction member for limiting an axial movement of the needle rollers is allowed to be brought into sliding contact, is formed on an end surface of the plurality of needle roller; and a radial inner end of the retainer is spaced radially outwardly from a radial outer end of the sliding-contact region.

In this invention, the radial inner end of the retainer is spaced radially outwardly from the radial outer end of the sliding-contact region where the needle rollers can be held in sliding contact with the restriction member. With this construction, the axial movement of each needle roller is limited not by the retainer but by the restriction member, and therefore a large axial force, developing as a result of skewing of the needle roller relative to its normal rotation axis, is received by the restriction member, and as a result the retainer, having low rigidity, can be satisfactorily used.

Therefore, any suitable material can be freely selected for the retainer, and for example a synthetic resin of a low strength can be selected, and besides the wall thickness of the retainer can be made small, and therefore its production cost as well as its weight can be reduced. When the wall thickness of the retainer and particularly the wall thickness of each bridge portion, disposed between any two adjacent restriction holes, are reduced, the multiple of the needle rollers can be increased, and by doing so, the torque-transmitting ability can be enhanced.

When the needle bearing is constructed so that the retainer has an inner diameter which is uniform over an entire axial length thereof, any flange portion is not formed at each of the opposite axial ends of the retainer, and therefore the effective axial length of the needle rollers can be increased, so that the torque transmitting-ability can be enhanced. And besides, the retainer is simplified in structure, and can be produced at low costs.

The use of the needle bearing in the speed reducer is particularly effective. That is, the speed reducer of the invention comprises: a shaft serving as an internal member; an external gear serving as an external member, wherein the external gear reduces a speed of rotation of the shaft, and transmits the rotation to an output member; a needle bearing provided in an annular space formed between the shaft and the external gear; and a restriction member for limiting an axial movement of the needle bearing; the needle bearing comprising: a retainer of a substantially-annular shape having a plurality of substantially-rectangular restriction holes therein extending in an axial direction of the retainer so as to be spaced at a predetermined interval in a circumferential direction of the retainer; and a plurality of needle rollers each of which is received in the respective restriction hole at a radially-outward end portion thereof and is held in rolling contact with both of an inner periphery of the external member and an outer periphery of the internal member, wherein a sliding-contact region, to which the restriction member is allowed to be brought into sliding contact, is formed on an end surface of the plurality of needle roller; and an inner diameter of the retainer is larger than an outer diameter of the restriction member disposed close to the needle rollers, so that a radial inner end of the retainer is spaced radially outwardly from a radial outer end of a sliding-contact region.

In the speed reducer, when the shaft is rotating relative to the external gear, the conical bearing imparts an axial flow to a lubricant within the speed reducer because of the contact angle. A gap is formed between the radial inner end of the retainer and that end of the inner ring (of the conical bearing) disposed close to the needle rollers, and therefore at this time, the lubricant flows into the needle bearing through this gap without being interrupted by the retainer, and can effectively lubricate the needle bearing. And besides, the very hard needle rollers can be brought into sliding contact with the very hard inner ring, and therefore even when the torque to be transmitted is made large, wear of these parts is small, so that a long lifetime can be obtained, and also the axial length of the speed reducer can be reduced.

When the speed reducer is constructed so that a plurality of the needle bearings are provided, and are spaced from each other in the axial direction, and a restriction flange, serving as a restriction member, is formed on the shaft, and is interposed between the adjacent needle bearings, and the inner diameter of the retainer at an axial end thereof is larger than an outer diameter of the restriction flange, so that the radial inner end of the retainer is spaced radially outwardly from a radial outer end of a sliding-contact region where the needle rollers can be held in sliding contact with the restriction flange.

Similar effects as described above can be obtained even in the case where a plurality of needle bearings are provided in the speed reducer.

DETAILED DESCRIPTION OF THE PREFERRED EMBODIMENTS

One preferred embodiment of the present invention will now be described with reference to the drawings.

Figure 1:
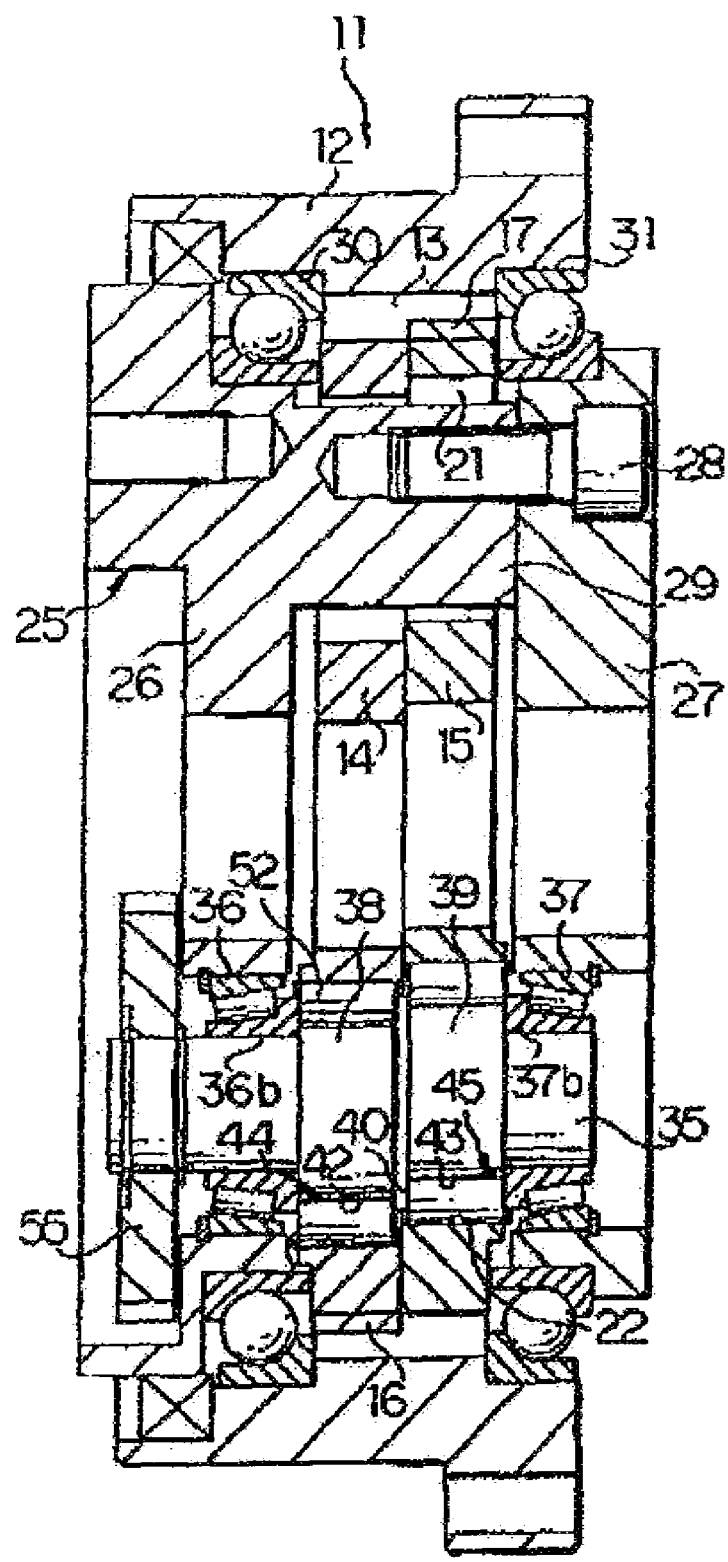
FIG. 1 is a side cross-sectional view showing one preferred embodiment of the present invention.
Figure 2:
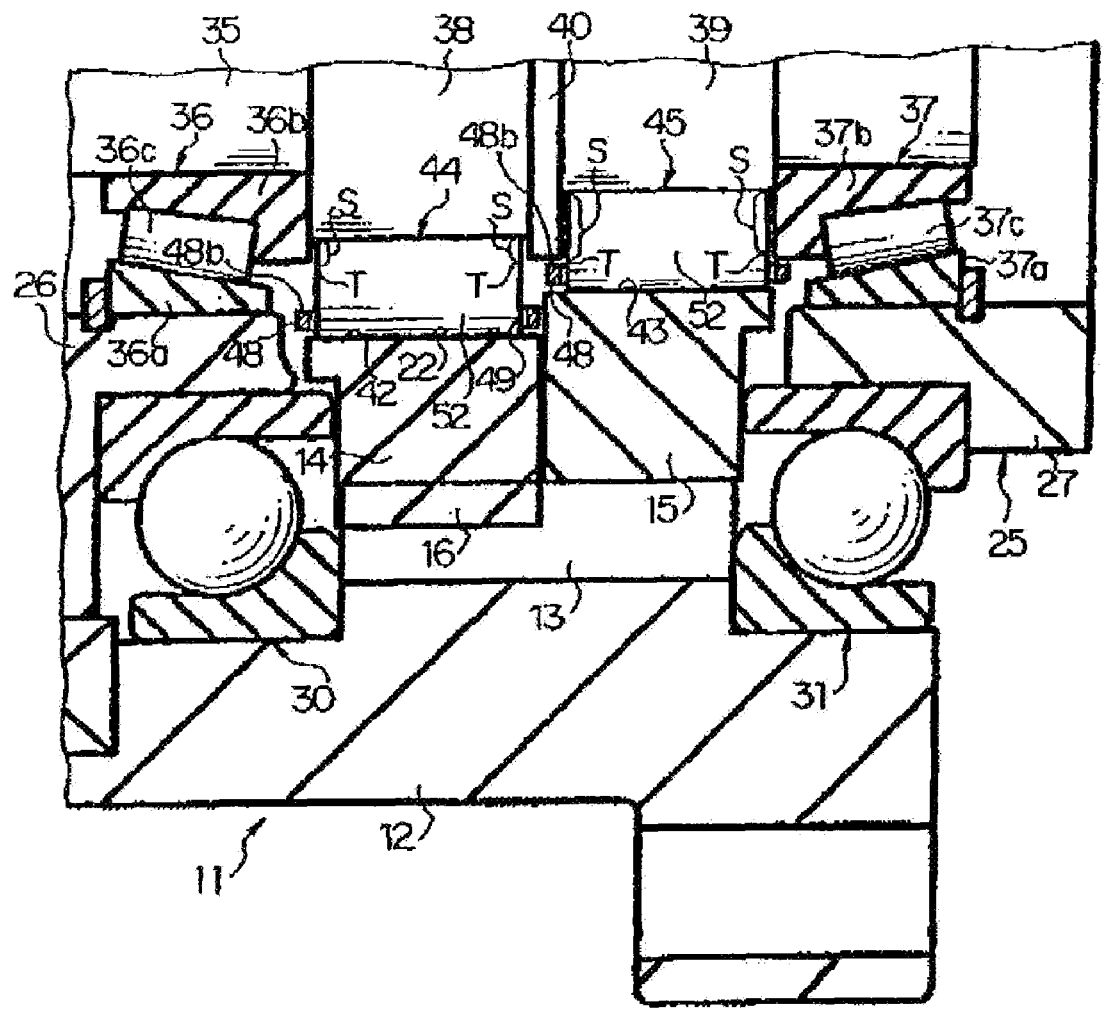
FIG. 2 is a side cross-sectional view showing needle bearings and the vicinity thereof.
Figure 3:
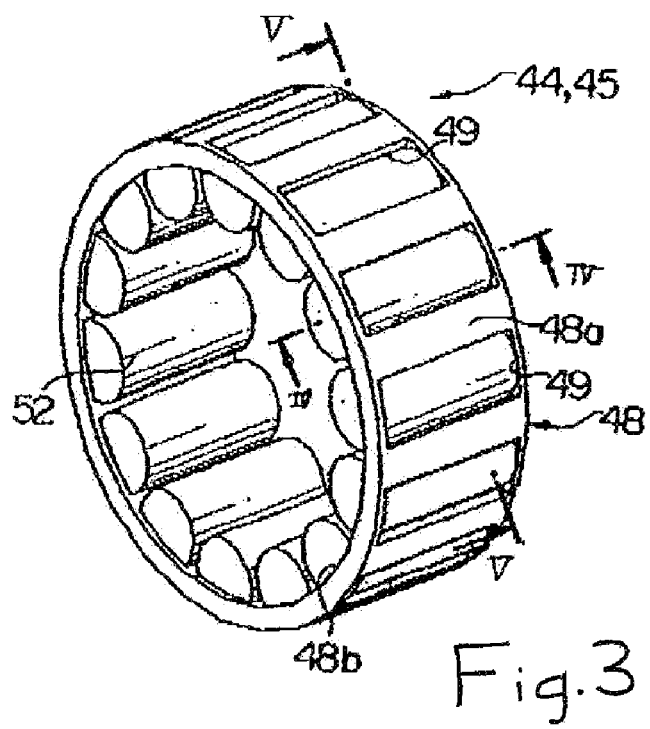
FIG. 3 is a perspective view of the needle bearing.
Figure 4:
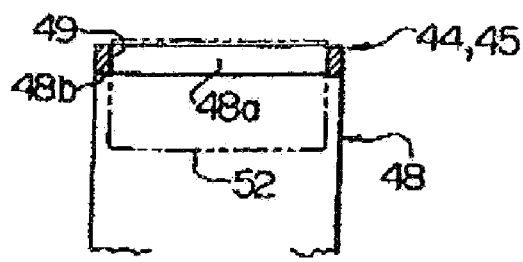
FIG. 4 is a cross-sectional view taken along the line IV-IV of FIG. 3.
Figure 5:
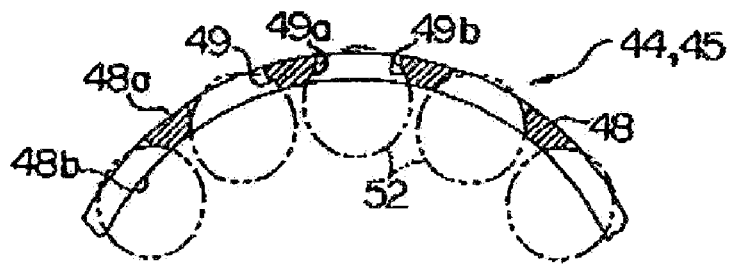
FIG. 5 is a cross-sectional view taken along the line V-V of FIG. 3.

In FIGS. 1 and 2, reference numeral 11 denotes a planetary gear speed reducer (more specifically, an eccentric rotary-type speed reducer) used in a robot or the like, and this speed reducer 11 includes a rotary casing 12 (serving as an output member) mounted on an arm, a hand or the like (not shown). A multiple of internal-tooth pins 13 (serving as internal teeth) are fixed to an inner periphery of the rotary casing 12 in substantially half-inserted relation thereto, and these internal-tooth pins 13 extend in an axial direction, and are spaced at equal intervals in a circumferential direction. A plurality of (two) ring-like external gears 14 and 15 (serving as external members) are received within the rotary casing 12, and are juxtaposed to each other in the axial direction. External teeth 16 are formed on the outer periphery of the external gear 14, while external teeth 17 are formed on the outer periphery of the external gear 15, the number of the external teeth 16, as well as the number of the external teeth 17, being slightly smaller than the number of the internal-tooth pins 13. The external teeth 16 and 17 of the external gears 14 and 15 are in mesh with the internal-tooth pins 13 of the rotary casing 12, and the maximum meshing portions (those portions where the depth of meshing is the largest) are 180 degrees out of phase with each other.

Through holes 21 and loose-fit holes 22 are formed through each of the external gears 14 and 15, and are arranged alternately in the circumferential direction. A carrier 25 is received within the rotary casing 12, and is mounted on a fixed robot member (not shown). This carrier 25 includes a pair of disk-like end plate portions 26 and 27 respectively facing axial outer surfaces of the external gears 14 and 15, and pillar portions 29 which are integrally connected at their one ends to the end plate portion 26, and are releasably connected to the end plate portion 27 by bolts 28. The pillar portions 29, interconnecting the end plate portions 26 and 27, extend in the axial direction, and are inserted in the respective through holes 21 in the external gears 14 and 15. Bearings 30 and 31 are interposed between the carrier 25 and the rotary casing 12, and more specifically the bearing 30 is interposed between the outer periphery of the end plate portion 26 and the inner periphery of one axial end portion of the rotary casing 12, while the bearing 31 is interposed between the outer periphery of the end plate portion 27 and the inner periphery of the other axial end portion of the rotary casing 12. The rotary casing 12 is rotatably supported on the carrier 25 by these bearings 30 and 31.

A plurality of shafts (crank shafts) 35 (equal in number to the loose-fit holes 22), serving as internal members, are spaced at equal intervals in the circumferential direction. Each of the shafts 35 is rotatably supported on the carrier 25 and more specifically on the end plate portions 26 and 27 by a conical bearing 36, fitted on one axial end portion of the shaft 23, and a conical bearing 37 fitted on the other axial end portion thereof. The conical bearing 36, 37 comprises an outer ring 36a, 37a of a substantially ring-shape, an inner ring 36b 37b loosely fitted in the outer ring 36a, 37a, and rollers 36c, 37c which are provided between the outer ring 36a, 37a and the inner ring 36b, 37b, and are held in rolling contact with these outer and inner rings. The rollers 36c, 37c are inclined to spread axially inwardly (a center in the axial direction). As a result, when each shaft 35 rotates, an axial flow due to the contact angle of the conical bearings 36 and 37 is imparted to a lubricant within the speed reducer 11.

Two eccentric cams 38 and 39 are formed on the axially-central portion of the shaft 35, and are offset an equal distance from the center axis thereof, and the two eccentric cams 38 and 39 are 180 degrees out of phase with each other. The shaft 35 has a restriction flange 40 (serving as a restriction member) formed between the eccentric cams 38 and 39 in coaxial relation to the shaft 35. The outer diameter of the restriction flange 40 is slightly larger than the outer diameter of the eccentric cams 38 and 39 such that the restriction flange 40 projects radially outwardly from the outer periphery of each of the eccentric cams 38 and 39 over the entire circumference thereof.

The axially-central portions of the shafts 35 (that is, the eccentric cams 38 and 39) are loosely fitted respectively in the loose-fit holes 22 of each of the external gears 14 and 15, and as a result an annular space 42 is formed between the external gear 14 and each shaft 35 (more specifically, the eccentric cam 38), and also an annular space 43 is formed between the external gear 15 and each shaft 35 (more specifically, the eccentric cam 39). A needle bearing 44 is received in the annular space 42 formed between the external gear 14 and the shaft 35 (more specifically, the eccentric cam 38), and a needle bearing 45 is received in the annular space 43 formed between the external gear 15 (more specifically, the eccentric cam 39) and the shaft 35, and the plurality of (two in this embodiment) needle bearings 44 and 45 are spaced from each other in the axial direction, and the needle bearing 44 allows relative rotation between the external gear 14 and the shaft 35, while the needle bearing 45 allows relative rotation between the external gear 15 and the shaft 35.

Thus, the conical bearings 36 and 37 are provided respectively on at least one sides (axial outer sides) of the needle bearings 44 and 45, and are held substantially in intimate contact with these needle bearings 44 and 45, respectively. The restriction flange 40 is disposed between the adjacent needle bearings 44 and 45. When the shafts 35 rotate at the same speed in the same direction, the external gears 14 and 15 make eccentric rotation (revolution) in such a manner that the two gears 14 and 15 are kept 180 degrees out of phase with each other.

As shown in FIGS. 1 to 5, each of the needle bearings 44 and 45 includes a retainer 48 of an annular shape having inner and outer diameters which are uniform over an entire axial length thereof. A multiple of restriction holes 49 of a rectangular shape are formed in each retainer 48, and extend in the axial direction, and are spaced at equal intervals in the circumferential direction. Here, the inner diameter of the retainer 48 is uniform over the entire axial length thereof as described above, and with this construction any flange portions (as described above for the conventional construction), projecting radially inwardly respectively from opposite axial ends of the retainer 48, do not exist, and therefore the effective axial length of needle rollers (described later) can be increased, so that a torque transmitting-ability can be enhanced. And besides, the retainer 48 is simplified in structure, and can be produced at low costs. Flange portions may be formed on and project radially inwardly a small distance from the opposite axial ends of the retainer 48, respectively, so as to increase the strength of the retainer 48. Thus, the retainer is formed into a substantially annular shape including a cylindrical tubular shape.

A multiple of needle rollers 52 (equal in number to the restriction holes 49) are received at their radially-outward end portions in the restriction holes 49, respectively. Each of these needle rollers 52 has a cylindrical shape, and extends parallel to the axis of rotation of the shaft 35. The needle rollers 52 of the needle bearing 44 are held in rolling contact with the inner periphery of the loose-fit hole 22 (in the external gear (external member) 14) and the outer periphery of the shaft (internal member) 35 (more specifically, the outer periphery of the eccentric cam 38), while the needle rollers 52 of the needle bearing 45 are held in rolling contact with the inner periphery of the loose-fit hole 22 (in the external gear (external member) 15) and the outer periphery of the shaft (internal member) 35 (more specifically, the outer periphery of the eccentric cam 39). Arcuate surfaces 49a and 49b, slightly larger in radius of curvature than the outer periphery of each needle roller 52, are formed respectively at radially-inward portions of circumferentially-opposite side surfaces of each restriction hole 49 (that is, circumferentially-opposite side surfaces of a bridge portion 48a formed between any two adjacent restriction hole 49). The outer periphery of the needle roller 52 is held in sliding contact with the corresponding two arcuate surfaces 49a and 49b which are spaced from each other in the circumferential direction.

The axial length of each needle roller 52 is slightly smaller than the axial length of the restriction hole 49, and is slightly smaller than the distance between the axial inner end surface of the inner ring 36b, 37b of the conical bearing 36, 37 and the corresponding side surface of the restriction flange 40 opposed to this axial inner end surface of the inner ring 36b, 37b. As a result, normally, a slight gap exists between each of the opposite axial end surfaces of the needle roller 52 and the corresponding one of the opposite axial end surfaces of the restriction hole 49, and also a slight gap exists between one axial end surface of each needle roller 52 and the axial inner end surface of the inner ring 36b, 37b while a slight gap exists between the other axial end surface of each needle roller 52 and the corresponding side surface of the restriction flange 40 opposed thereto. The first-mentioned gap is larger than the second- and third-mentioned gaps.

As a result, when the needle roller 52 is displaced in the axial direction, the axial outer end surface of the needle roller 52 is brought into sliding contact (abutting engagement) with the axial inner end surface of the inner ring 36b, 37b, or the axial inner end surface of the needle roller 52 is brought into sliding contact (abutting engagement) with the side surface of the restriction flange 40, so that the axial movement of the needle roller 52 is limited. Thus, the axial opposite end surfaces of each needle roller 52 can be brought into sliding contact with the inner ring 36b, 37b and the restriction flange 40 which serve respectively as the restriction members.

The inner diameter of the retainer 48 (of the needle bearing 44, 45) at its axial outer end (or the inner diameter of the flange portion in the case where the flange portion is formed) is larger than the outer diameter of the axial inner end (disposed close to the needle roller 52) of the inner ring 36b, 37b of the conical bearing 36, 37. As a result, a radial inner end 48b of the retainer 48 is spaced radially outwardly from a radial outer end T of a sliding-contact region S (where the needle rollers 52, when displaced in the axial direction, are brought into sliding contact with the inner ring 36b, 37b) where the needle rollers 52 can be held in sliding contact with the inner ring 36b, 37b.

In this embodiment, the inner diameter of the retainer 48 at its axial inner end is larger than the outer diameter of the restriction flange 40, and as a result the radial inner end 48b of the retainer 48 is spaced radially outwardly from a radial outer end T of a sliding-contact region S (where the needle rollers 52, when displaced in the axial direction, are brought into sliding contact with the restriction flange 40) where the needle rollers 52 can be held in sliding contact with the restriction flange 40. Here, the eccentric cams 38 and 39 and the needle bearings 44 and 45 are eccentric with respect to the axis of rotation of the shaft 35, and therefore the radial lengths of the sliding-contact regions S are different, depending on their position in the circumferential direction; however, at any position in the circumferential direction, the radial inner end 48b is spaced radially outwardly from the radial outer end T of the sliding-contact region S, with a gap formed therebetween.

Input gears 55 are fixedly mounted respectively on one end portions of the shafts 35 projecting from one end surface of the end plate portion 26, and these input gears 55 are arranged at equal intervals on a circle. An external gear (which is driven by a servomotor (not shown), and is disposed coaxially with the rotary casing 12) is in mesh with these input gears 55. The rotary casing 12, the internal-tooth pins 13, the external gears 14 and 15, the carrier 25, the shafts 35 and the input gears 55 jointly form the speed reducer 11. In this speed reducer 11, the rotation of the shafts 35 is reduced in speed by the eccentric rotation of the external gears 14 and 15, and is outputted to the rotary casing 12, thereby rotating this rotary casing 12 at low speed.

Next, the operation of one preferred embodiment of the invention will be described.

When the servomotor is operated, the external gear is rotated. The rotation of this external gear is transmitted to the shafts 35 via the input gears 55, so that these shafts 35 are rotated about their respective rotation axes at the same speed in the same direction. At this time, the eccentric cams 38 and 39 of each shaft 35 make eccentric rotation respectively within the corresponding loose-fit holes 22 formed respectively in the external gears 14 and 15, thereby causing the external gears 14 and 15 to make eccentric rotation (revolution). Since the number of the external teeth 16, as well as the number of the external teeth 17, is slightly smaller than the number of the internal-tooth pins 13 as described above, the rotation of each shaft 35 is reduced in a high ratio by the external gears 14 and 15, and is transmitted to the rotary casing 12, thereby rotating this rotary casing 12 at low speed.

As described above, the inner diameter of the retainer 48 at its axial outer end is larger than the outer diameter of that end of the inner ring 36b, 37b disposed close to the needle roller 52, and also the inner diameter of the retainer 48 at its axial inner end is larger than the outer diameter of the restriction flange 40. With this construction, the radial inner end 48b is spaced radially outwardly from the radial outer end T of the sliding-contact region S, and by doing so, the axial movement of each needle roller 52 is limited not by the retainer 48 but by the inner ring 36b, 37b and the restriction flange 40. Therefore, a large axial force, developing as a result of skewing of the needle roller 52 relative to its normal rotation axis, is received not by the retainer 48 but by the inner ring 36b, 37b and the restriction flange 40, and as a result the retainer 48, having low rigidity, can be satisfactorily used.

Therefore, any suitable material can be freely selected for the retainer 48, and for example a synthetic resin of a low strength can be selected, and besides the wall thickness of the retainer can be made small, and therefore its production cost as well as its weight can be reduced. When the wall thickness of the retainer 48 and particularly the wall thickness of each bridge portion 48a are reduced, the number of the needle rollers 52 can be increased to such an extent that the needle rollers are arranged very closely over the entire circumference of the retainer, and by doing so, the torque-transmitting ability can be enhanced.

When each shaft 35 is rotating relative to the external gears 14 and 15, the conical bearings 36 and 37 impart an axial flow to the lubricant within the speed reducer 11 because of their contact angle as described above. The gap is formed between the radial inner end 48b of the retainer 48 and that end of each inner ring 36b, 37b disposed close to the needle rollers 52, and therefore at this time, the lubricant flows into the needle bearings 44, 45 through this gap without being interrupted by the retainer 48, and can effectively lubricate the needle bearing 44, 45. And besides, the very hard needle rollers 52 can be brought into sliding contact with the very hard inner ring 36b, 37b, and therefore even when the torque to be transmitted is made large, wear of these parts is small, so that a long lifetime can be obtained.

In the above embodiment, although the shafts 35 (serving as the internal members) are rotated relative to the external gears 14 and 15 (serving as the external members), the invention can be applied to a construction in which external members rotate relative to internal members. In the above embodiment, although the conical bearings 36 and 37 are provided respectively at one sides (axial outer sides) of the needle bearings 44 and 45, such conical bearings can be provided respectively at the opposite sides of each of the needle bearings.

In the above embodiment, although the inner rings 36b and 37b of the conical bearings 36 and 37 are used as the restriction members, thrust plates or the like can be used as such restriction members, in which case preferably, the restriction member has, for example, a ring-like shape with a circular periphery. In the above embodiment, although each of the restriction holes 49 have a rectangular shape, it is formed into a substantially rectangular shape (barrel-like shape) increasing in width gradually toward a central portion thereof when the needle rollers have a barrel-like shape.

As described above, in the present invention, any suitable material can be freely selected for the retainer, and besides the wall thickness of the retainer can be made small.

We claim:

1. A speed reducer comprising:
    a shaft serving as an internal member;
    an external gear serving as an external member, wherein the external gear reduces a speed of rotation of the shaft, and transmits the rotation to an output member;
    a needle bearing provided in an annular space formed between the shaft and the external gear; and
    a restriction member for directly limiting axial movement of the needle bearing;
    the needle bearing comprising:
    a retainer of a substantially-annular shape having a plurality of substantially-rectangular restriction holes therein extending in an axial direction of the retainer so as to be spaced at a predetermined interval in a circumferential direction of the retainer; and
    a plurality of needle rollers each of which is received in the respective restriction hole at a radially-outward end portion thereof and is held in rolling contact with both of an inner periphery of the external member and an outer periphery of the internal member,
    wherein a sliding-contact region, to which the restriction member is allowed to be brought into direct sliding contact, is formed on an end surface of each of the plurality of needle rollers for limiting axial movement of the needle rollers; and
    an inner diameter of the retainer is larger than an outer diameter of the restriction member disposed close to the needle rollers, so that a radial inner end of the retainer is spaced radially outwardly from a radial outer end of a sliding-contact region.

2. A speed reducer according to claim 1, wherein an inner ring of a conical bearing, rotatably supporting the shaft, is served as the restriction member.

3. A speed reducer comprising:
    a shaft serving as an internal member;
    an external gear serving as an external member, wherein the external gear reduces a speed of rotation of the shaft, and transmits the rotation to an output member;
    a needle bearing provided in an annular space formed between the shaft and the external gear; and
    a restriction member for limiting axial movement of the needle bearing;
    the needle bearing comprising:
    a retainer of a substantially-annular shape having a plurality of substantially-rectangular restriction holes therein extending in an axial direction of the retainer so as to be spaced at a predetermined interval in a circumferential direction of the retainer; and
    a plurality of needle rollers each of which is received in the respective restriction hole at a radially-outward end portion thereof and is held in rolling contact with both of an inner periphery of the external member and an outer periphery of the internal member,
    wherein a sliding-contact region, to which the restriction member is allowed to be brought into sliding contact, is formed on an end surface of each of the plurality of needle rollers for limiting axial movement of the needle rollers; and
    an inner diameter of the retainer is larger than an outer diameter of the restriction member disposed close to the needle rollers, so that a radial inner end of the retainer is spaced radially outwardly from a radial outer end of a sliding-contact region, wherein a plurality of the needle bearings are arranged so as to be spaced from each other in an axial direction thereof, and a restriction flange serving as the restriction member is formed on the shaft so as to be interposed between adjacent ones of the needle bearings, and the inner diameter of the retainer at an axial end thereof is larger than an outer diameter of the restriction flange.

* * * * *